Dec. 15, 1964  H. P. KEY  3,161,238
HELICOPTER ROTOR BLADE
Filed July 5, 1962
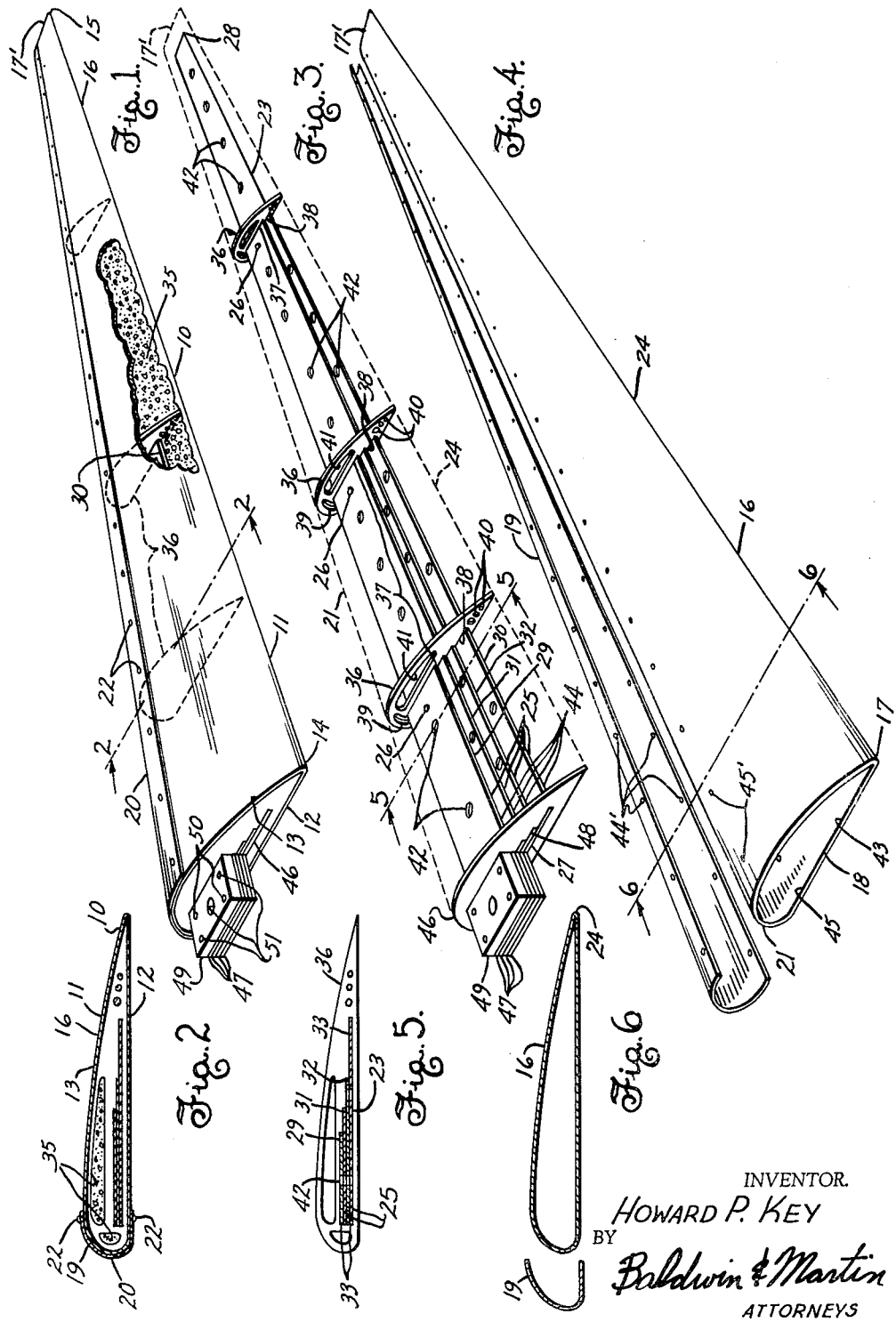
INVENTOR.
HOWARD P. KEY
BY
Baldwin & Martin
ATTORNEYS

United States Patent Office 3,161,238
Patented Dec. 15, 1964

3,161,238
HELICOPTER ROTOR BLADE
Howard P. Key, 306 Bryant Road, Warrington, Fla.
Filed July 5, 1962, Ser. No. 207,660
3 Claims. (Cl. 170—159)

This invention relates to aircraft sustaining rotor blades, and more particularly to rotor blades for helicopters.

One object of the invention is to provide rotor blades embodying improved construction details which enhance the lifting capabilities of the blades and their ease of manufacture.

Another object of the invention is to provide improvements in rotor blades for helicopters that enable the blade to suffer considerable damage and still be useful for sustaining the aircraft.

Another object is to provide a rotor blade which is inexpensive to manufacture and adaptable to mass production techniques.

Still another object of the invention is to provide a principal strength member for helicopter rotor blades that embodies details of construction which can be readily employed to secure a proper weight distribution in the blade so as, for example, to obtain the optimum chordwise center of gravity therefor while providing the desired strength characteristics for such blades.

Still another object of the invention is to provide a principal strength member for helicopter rotor blades which embodies features that provide for high spanwise tensile strength characteristics at the leading edge of the member and suitable compressive strength characteristics along the trailing edge of the member.

Still another object is to provide a rotor blade construction which is especially adaptable to the use of light weight cellular plastic materials in the manufacture of such blades.

Still another object is to provide a rotor blade construction which is adaptable to quick and accurate fabrication.

Still another object is to provide construction details for helicopter rotor blades which enable the use of inexpensive materials.

Another object is to provide a principal strength member for rotor blades which is capable of carrying all of the centrifugal load imposed on the blade which provides for high torsional rigidity while maintaining the center of gravity well forward in the blade.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIGURE 1 is a perspective view of a helicopter rotor blade embodying features of the invention, certain parts being broken away to expose internal components of the blade.

FIGURE 2 is a chordwise cross sectional view taken along the lines 2—2 of the blade seen in FIGURE 1.

FIGURE 3 is a perspective view of the principal strength member of the blade seen in FIGURE 1 and further illustrates certain ribs or spacers which may be embodied in the assembled blade and utilized in the process of manufacture thereof.

FIGURE 4 is an exploded perspective view, in this case, of the airfoil forming components of the blade shown in FIGURE 1.

FIGURE 5 is a chordwise sectional view along the lines 5—5 of FIGURE 3.

FIGURE 6 is a chordwise sectional view along the lines 6—6 of FIGURE 4.

The assembled blade is generally shown in FIGURE 1, and is designated therein at 10. Blade 10 has an airfoil 11 which, in the illustration, has a lower flat surface 12 and an upper cambered surface, the latter being designated at 13. The camber of the upper airfoil surface 13 in the illustrated embodiment extends throughout the span of the airfoil, i.e., from the root end 14 to the tip end 15 of the blade. By virtue of the cambered structure and its spanwise extent, the lifting capacity of the blade is greater than conventional blades avoiding the use of such surfaces. Conventional blades, as is generally known, only utilize an outboard tip portion constituting usually about 40% of the span length of the blade, for lifting purposes, and the lift in such cases is primarily caused by the employed pitch and rotational speed of the blade during use. The balance of the blade length in such cases merely serves to support and connect the useful portion of the blade to the rotor hub, and consequently creates a useless drag. Through use of a camber surface 13 throughout the entire length of the airfoil, lifting capacity is built into the entire length of the blade. To reduce the air drag and to secure maximum lifting capacity from the slower moving inboard portions of the blade, the airfoil generally tapers from its root end 14 to its tip end 15. Consequently the length of the chord for the cambered surface 13 progressively diminishes from the root end 14 to the tip end 15 of the airfoil 11.

The structural components forming the airfoil 11 shown in FIGURE 1 are best seen in FIGURES 4 and 6, and includes an elongated tapering hollow shell designated at 16. Shell 16 is preferably formed of layers of strong fabric material which are impregnated with a suitable bonding material and molded together in accord with well known procedures. One suitable fabric material which may be used comprises glass filaments that are spun into thread which is thereafter woven into a cloth fabric commonly called "Fiberglas cloth." Other fabrics, of course, may be employed when desired. For the bonding material, it is preferable to use a thermosetting plastic material such as one of the well known alkyd resins which are commonly used for bonding Fiberglas cloths into laminate structures. However, other plastic or resinous bonding materials may be employed for the impregnation and bonding of the layers of glass fabric material, for instance, the well known urea-formaldehyde or phenol formaldehyde resins.

In the process of forming the shell 16, the laminar structure of the shell walls is built up in layers to the desired wall thickness on a suitable male mold having the desired internal shape of the shell, the layers being impregnated with bonding material and the bonding material thereafter caused to cure by the application of heat and pressure in accord with well known procedures.

Shell 16 has an opening 18 at the root end 17 of the structure and has an elongated tapering hollow portion 43 which extends therefrom to the closed end of the structure which is designated at 17'. The leading edge 20 of the airfoil 11 is formed by an elongated thin metal plate section 19 preferably of aluminum and which is more or less arcuate in shape and adapted to fit over the leading edge 21 of the shell. Plate section 19 serves as a gravel shield to protect the shell portion of the blade from damage. Plate 19 is secured at the leading edge 21 of the shell 16 by suitable rivets 22 which pass through horizontally spaced holes 44' and 45' in the plate 19 and shell 16 respectively. Shell 16 tapers from the root end to the tip end thereof and the rear edge 24 thereof forms the trailing edge of the airfoil.

The principal longitudinal strength member of the blade 10 is best seen in FIGURES 3 and 5 as a rib supporting spar 23 which, as depicted in FIGURE 3, with reference to the broken line designation of the leading edge 21, trailing edge 24 and tip end extremity 17' of the shell 16, extends spanwise of the shell 16 substantially within and throughout the length of the hollow 43 thereof.

Spar 23 is composed of a plurality of elongated plates, generally designated at 25, which are arranged in the hollow 43 of the shell with their longitudinal axes generally in parallel with each other and extending spanwise thereof. Each of the plates 25 has a uniformly tapering width dimension which diminishes from the root or inboard end of the plate to its opposite end, and it is evident from FIGURE 3 that each of the plates has a different length dimension. Plates 25 are arranged in face to face relation in the assembled spar, and are secured together by means of rivets 26, with their root ends, collectively designated at 44, arranged generally one on top of the next. Because of the particular plate arrangement in the assembly and the different length dimensions thereof the outer ends 37 of the plates are spaced one from the next along the span of the spar. In the arrangement shown, the shortest plate 29 is at the top of the assembly whereas the longest plate 30 is at the bottom of the assembly, the intermediate plates 31 and 32 being arranged therebetween and in the order of their length so that assembly of plates 25 provides an elongated structure which generally tapers from its root end 27 to the tip end 28 thereof. In this respect the overall thickness of the spar 23, which at the root end of the span consists of the summed thickness dimensions of plates 29, 30, 31 and 32, diminishes stepwise from the root end 27 to the tip end 38 of the spar, whereas the overall width dimension of the spar, which is determined by plate 30, uniformly diminishes from the root end to the tip end of the spar.

In the assembled blade 10, the plates 25 are disposed in the hollow 43 of shell 16 substantially in parallel with the chordal plane of the cambered airfoil 11 so that more or less maximum resistance to bending due to the application of torque thereto is afforded. As seen in FIGURE 5, the assembled plates 25 of the spar 23 are so arranged that their leading or front edges 33 are in vertical alignment, when viewed in chordwise cross-section, whereas the rear edges 34 of the plates 25 are horizontally offset from one another so that the rear edge of each overlying plate is offset forwardly of the rear edges of the plates therebelow. This arrangement provides the greatest resistance to spanwise tensile stresses along the leading edge of the spar while nevertheless providing adequate structure to handle the compressive forces along the trailing edge of the spar. Additionally, through the use of the laminated type spar structure shown, the weight distribution of the spar 23 can be readily fixed so that the chordwise center of gravity of the assembled blade is forward in the blade structure as is a well known desideration in rotor blade design.

Plates 25 as assembled form a resilient spar member and are preferably made of stainless steel or other suitable metal. Plates 29 and 31, for example, may be stainless steel plates which have a thickness of $\frac{1}{16}$ inch, whereas plates 30 and 32 may have a thickness of $\frac{1}{32}$ inch. One of the advantages to using a spar member composed of laminated plate elements lies in the ability to avoid using complicated machinery and other procedures for securing proper weight distribution and strength qualities in the spar. Through the use of the laminated type spar each plate can be formed from sheet metal material by simple shearing procedures and the desired weight distribution of the spar can be easily obtained through proper location of the plates in the assembled spar.

In the assembled blade 10, spar 23 is offset from the inner surface of the shell and the unfilled voids in the hollow 43 of the shell are filled with light weight cellular plastic material, which is generally shown at 35 in FIGURES 1 and 2. This cellular plastic material 35 is formed in situ during the process of assembling the blade so as to form a continuous mass which fills all the voids in the hollow shell and secures the spar 23 to the encasing shell 16. To facilitate the proper disposition and location of the spar within the hollow 43 of the shell 16 during the manufacturing process, a plurality of ribs 36 are used to space the spar from the inner surface 45 of the shell.

These ribs 36 are mounted transversely on the spar 23 and are spaced spanwise thereon, one from the next, in the assembled blade 10, as seen in FIGURES 1 and 3. Each of the ribs 36 is provided with a transverse opening through which the spar 23 extends, the openings being collectively designated at 38. These openings 38 in the ribs 36 are such as to permit the ribs to be slid over the tip end 28 of the tapered spar and into respective spaced positions thereon at which they abut the respective end extremities 37 of plates 29, 31 and 32, as seen in FIGURE 3. The ends 37 of these plates function as stops which engage the sides of the ribs 36 adjacent the openings and thus prevent spanwise movement of the ribs in the direction of the root end 27 of the spar when the rib carrying spar 23 is thereafter inserted through the opening 18 and into the hollow 43 of the shell 16.

Each of the ribs 36 has peripheral contours that conforms to the contour of inner surface 45 of the tapered shell 16 at the desired position therefor in the assembled blade 10. Ribs 36 are also provided with transverse openings 39, 40 and 41 at the leading and trailing portions of the ribs and above the spar 23 respectively so as to permit the cellular plastic material to expand into and fill these openings when it is formed in the shell to thereby generally fix the ribs in their spaced relation.

Ribs 36 may be of any suitable light weight material having the desired strength properties. Preferably, however, the ribs are molded from fibrous glass materials which are impregnated with one of the previously mentioned resinous bonding materials used in the fabrication of shell 16. They may be formed by well known molding procedures in which the fibrous material is impregnated with the bonding agent and in a suitable mold the bonding agent cured by known heating and pressure techniques.

In the process of manufacturing the blade 10, and after the rib carrying spar 23 has been inserted and properly positioned in the hollow shell 16, the mass of light weight cellular plastic material 35 is formed in the hollow of the shell.

As seen in FIGURES 3 and 5, spar 23 is provided with a plurality of holes 42 that extend through the assembled plates 25. These holes 42, as well as all other unfilled voids in the hollow of the shell are filled by the cellular plastic material which is formed in the hollow of the shell during the manufacturing procedure. As such, the voids in the hollow 43 are filled by a continuous mass of the cellular plastic material which encases and extends through the openings 42 in the spar 23. This mass of cellular plastic material also extends through the various openings therefor in the shell spacer ribs 36 so that these spacers are fixed in their spanwise spaced positions on the spar 23.

The cellular plastic material 35 which encases the spar 23 and forms a core portion of the blade 10 that supports the shell against collapsing during use is an expanded or cellular resinous material selected for its low density and form retaining capability. Suitable core materials may be alkyd resin-diisocyanate cellular or formed resin compounds which are self-binding to the surfaces of the spar 23 and the shell such as those disclosed in Simon et al. Patent No. 2,591,884. Alternative materials may be a cellular polyester plastic, a cellular phenolic plastic or a cellular urea—or phenol—formaldehyde resin, all of which may be formed in the hollow of the shell in accord with well known foaming procedures.

The resinous material selected for the core material should provide a good bond between the core and the shell and in this respect it is preferable to select monomeric materials for the preparation of the cellular core structure which are also used in bonding the laminates of the shell.

In the process of manufacturing the blade 10, the materials which are polymerized to form the spar encasing mass of cellular plastic core material 35 are inserted in the opening of shell after the spar has been properly positioned in the hollow 43 and the shell forms a mold for the core forming material. After the voids in the hollow have been filled by the material, root end rib 46 is placed in the opening 18.

As seen in FIGURES 1 and 3, the plates 25 have integral root end extensions 47 to which an adapter for connecting the blade to the rotor hub may be secured. Rib 46 is provided with a suitable transversely extending hole 48 into which the root ends of the plates extend and laterally of which the plate extensions 47 extend. Rib 46 is preferably inserted in the opening 18 near the end of the core forming process so that the core forming material becomes firmly bonded thereto along its inside. Block 49 is bolted as by bolts 50, on top of the extensions 47 and abuts the outside of the rib. Block 49 and extensions 47 have suitable holes 51 to enable connection of the blade 10 to a suitable adapter for interconnecting the blade and rotor hub therefor.

Among the features of the invention is one of safety, it being well known that the rotor blades of a helicopter are the sole flight sustaining components thereof, and consequently, when damaged as by contact with bullets or otherwise as in wartime usually result in disaster. On the other hand, in the blade described herein as embodying the concepts of the invention considerable damage can result to the blade before flight sustension is lost because the spar 23 itself is the principal strength forming member of the blade and so positioned in the airfoil as to be capable of acting as the airfoil upon proper control of the pitch of the blade when damage to the blade results in the loss of portions of the shell and spar encasing material.

Although the blade embodiment of the invention shown herein is not a design which permits fast air speeds, it nevertheless is particularly useful where the aircraft is used frequently for hovering purposes as when dusting crops or lifting objects of extreme weight, and possesses structural features which enable more effective use of the horsepower output of the aircraft while so hovering.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A helicopter rotor blade comprising hollow means constituting an elongated cambered airfoil having a chord which progressively diminishes in length from the root end to the tip end of the blade, a tapered spar extending spanwise in the hollow of said means, and cellular plastic material, formed in the hollow of said means, encasing said spar and securing it to said hollow means for supporting the airfoil against collapsing during use of the blade, said spar including a plurality of elongated flat metal plates arranged substantially in parallel with the chordal plane of the airfoil and being secured together in face to face relation, said plates being adapted and arranged to constitute a spar having a thickness dimension which diminishes stepwise from the root end to the tip end thereof and which at the root end of the spar increases stepwise in a forward direction from the trailing edge thereof.

2. A helicopter rotor blade comprising hollow means constituting an elongated cambered airfoil having a chord which progressively diminishes in length from the root end to the tip end of the blade, a tapered spar extending spanwise in the hollow of said means, and cellular plastic material, formed in the hollow of said means, encasing said spar and securing it to said hollow means for supporting the airfoil against collapsing during use of the blade, said spar including a plurality of elongated flat metal plates arranged substantially in parallel with the chordal plane of the airfoil and being secured together in face to face relation, said flat metal plates being adapted and arranged to provide overall width and thickness dimensions of the spar which diminish from the root end to the tip end thereof with the overall thickness dimension diminishing stepwise from said root end to said tip end, and at least one of said flat metal plates extending substantially throughout the length dimension of said hollow.

3. A helicopter rotor blade comprising hollow means constituting an elongated cambered airfoil having a chord which progressively diminishes in length from the root end to the tip end of the blade, a tapered spar extending spanwise in the hollow of said means, and cellular plastic material, formed in the hollow of said means, encasing said spar and securing it to said hollow means for supporting the airfoil against collapsing during use of the blade, said spar including a plurality of elongated flat metal plates arranged substantially in parallel with the chordal plane of the airfoil and being secured together in face to face relation, said flat metal plates having different length dimensions and being arranged from one side to the other side of said spar in the order of increasing length, and at least one of said plates extending substantially throughout the length dimension of said hollow, said blade further comprising a plurality of elongated ribs arranged transversely of said spar and with said spar extending therethrough, each of said ribs being disposed abuttingly against a respective one of the ends of said plates.

References Cited by the Examiner

UNITED STATES PATENTS

| | | | |
|---|---|---|---|
| 1,606,908 | 11/26 | Stieber | 170—159 |
| 1,984,044 | 12/34 | Sukohl | 170—159 |
| 2,400,649 | 5/46 | Larsen | 170—159 |
| 2,494,625 | 1/50 | Martin | 170—159 |
| 2,590,064 | 3/52 | Caldwell | 170—159 |
| 2,728,702 | 12/55 | Simon | 170—159 |
| 2,767,461 | 10/56 | Lebold | 170—159 |
| 2,961,053 | 11/60 | Prewitt | 170—159 |

FOREIGN PATENTS

| | | |
|---|---|---|
| 18,512 | 2/35 | Australia. |
| 817,659 | 5/37 | France. |
| 124,253 | 3/19 | Great Britain. |
| 469,086 | 7/37 | Great Britain. |
| 552,322 | 4/43 | Great Britain. |
| 604,404 | 7/48 | Great Britain. |
| 724,758 | 2/55 | Great Britain. |

EDGAR W. GEOGHEGAN, *Primary Examiner.*

EMILE PAUL, ABRAM BLUM, JULIUS E. WEST,
*Examiners.*